(12) United States Patent  
Mochizuki

(10) Patent No.: US 7,055,998 B2  
(45) Date of Patent: Jun. 6, 2006

(54) VEHICLE LAMP HAVING OVERLAPPING REFLECTIVE AREA

(75) Inventor: Katsumi Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 328 days.

(21) Appl. No.: 10/449,553

(22) Filed: May 30, 2003

(65) Prior Publication Data

US 2003/0227781 A1 Dec. 11, 2003

(30) Foreign Application Priority Data

Jun. 7, 2002 (JP) .................................... 2002-166507

(51) Int. Cl.  
*F21V 7/00* (2006.01)

(52) U.S. Cl. .................... 362/518; 362/297; 362/346; 362/544

(58) Field of Classification Search ................ 362/518, 362/543, 544, 520, 521, 522, 241, 243, 247, 362/297, 346  
See application file for complete search history.

(56) References Cited

U.S. PATENT DOCUMENTS

| 5,692,824 A | 12/1997 | Ooishi | 362/80 |
| 6,402,356 B1 * | 6/2002 | Gotou | 362/543 |
| 6,505,962 B1 | 1/2003 | Gotou | 362/517 |

* cited by examiner

*Primary Examiner*—John Anthony Ward  
(74) *Attorney, Agent, or Firm*—Koda & Androlia

(57) ABSTRACT

A vehicular lamp including a first lamp component having a first light source and a first reflector, and a second lamp component disposed behind the first lamp component and having a second light source and a second reflector, and front sides of the first and second lamp components being covered by an outer lens; and in this vehicular lamp, the first reflector having an overlapping area that covers the front of the second reflector so that the second reflector appears to be segmented in two or more portions; and light transmission holes through which light from the second lamp component passes being formed in the overlapping area of the first reflector.

9 Claims, 4 Drawing Sheets

VEHICLE LAMP HAVING OVERLAPPING REFLECTIVE AREA

BACKGROUND OF THE INVENTION

1. Field of the Invention

The present invention relates to a vehicular lamp and more particularly to a vehicular lamp that has two lamp components which can give an unexpected appearance.

2. Prior Art

One type of known vehicular lamp has two lamp components with one lamp component being in front of the other. Such two lamp components respectively have light sources and reflectors that reflect light from the light sources in the forward direction. In an automobile lamp included in such a vehicular lamp, for instance, one lamp component functions as a turn signal lamp and another lamp component functions as a clearance lamp; and these lamp components are both covered by a single outer lens.

In this automobile lamp, the clearance lamp component produces white light, and the turn signal lamp component produces amber light; therefore, the appearance changes when they are lit and when they are not lit, giving an observer a sense of unexpectedness.

If, in such automobile lamp, the two lamp components are provided so as to be overlapped lengthwise (one being front of the other) such that one lamp component blocks a part of the other lamp component, then the other lamp component appears as if it is divided into two portions and gives a further sense of novelty.

However, when two lamp components are installed in a lengthwise overlapped manner so that one (first) lamp component blocks a part of the other (second) lamp component thus allowing the other lamp component to appear as if it is divided into two portions, there is no problem when both lamp components are not lit because it only gives an observer a sense of unexpectedness. However, a problem occurs when only the second lamp component which is behind the first lamp component is lit. More specifically, when the second lamp is lit, the light indicative of a single function (turning, for instance) appears to be divided into two portions. In other words, when the second lamp is a marker lamp, the light showing the functional color (amber) appears to be divided in two portions, and thus such divided lights interfere with (hinders) a determination of observers on what the lamp intends to indicate, which is not permissible for a vehicular marker lamp that requires observers to make an instantaneous determination of the meaning of the lamp or the color of the light.

SUMMARY OF THE INVENTION

Therefore, the object of the present invention is to provide a vehicular lamp that gives an unexpected appearance when it is lit and not lit without generating an ambiguous display when it is lit.

The above object is accomplished by a unique structure for a vehicular lamp that includes a first lamp component having a first light source and a first reflector, and a second lamp component having a second light source and a second reflector, with the front sides of such two lamp components being covered by an outer lens; and in the present invention, the first reflector has an overlapping area that covers the front area of the second reflector such that the second reflector appears to be segmented in two or more portions; and at least a part of such an overlapping area is formed with a light transmission portion that allows the light from the second lamp component to pass through.

Accordingly, in the vehicular lamp of the present invention, the light from the second lamp component passes through the light transmission hole formed in the overlapping area of the reflector of the first lamp component and is radiated in the forward direction; accordingly, the second lamp component does not look as if it is divided into two segments when it is lit.

DETAILED DESCRIPTION OF THE INVENTION

Embodiments of the vehicular lamp according to the present invention will be described below with reference to the accompanying drawings. The embodiments are described on a vehicular headlamp for an automobile.

The shown vehicular lamp 1, which is an automobile headlamp, is to be mounted on the right side of a vehicle (when facing the vehicle), and the structure of the present invention is applied to a front turn lamp component and a clearance lamp component of the right side vehicular lamp.

The vehicular lamp 1 is provided with two headlamp components 2 and 3 in addition to a front turn lamp component and a clearance lamp component. The headlamp components 2 and 3 are respectively provided with light sources and reflectors (not shown). The headlamp component 2 radiates a high beam, and the headlamp component 3 radiates a low beam. A detailed description of these headlamp components 2 and 3 is given below and in the accompanying drawings.

Figure 1:
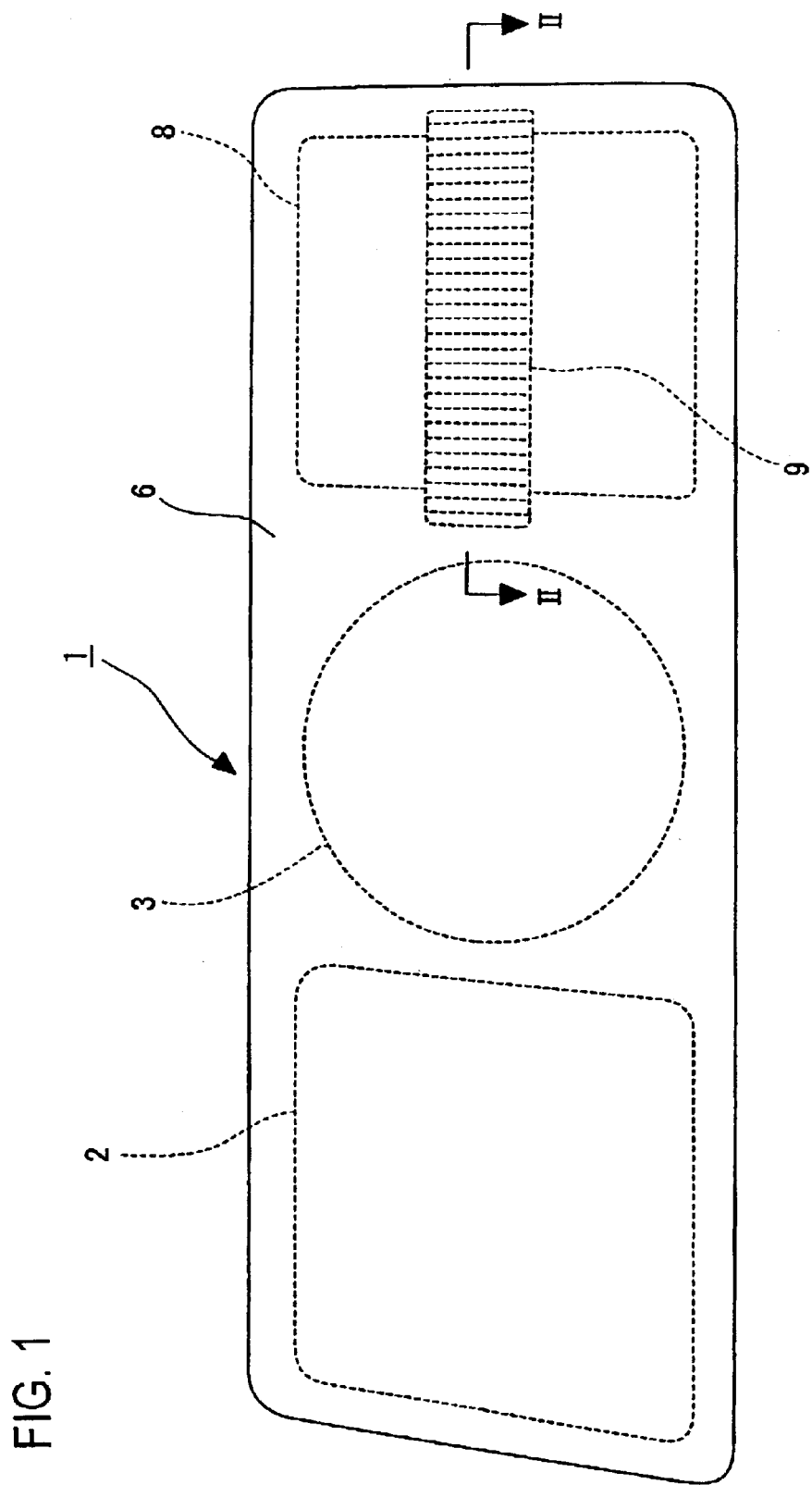
FIG. 1 is an entire front elevational view of a vehicular lamp according to one embodiment of the present invention.
Figure 2:
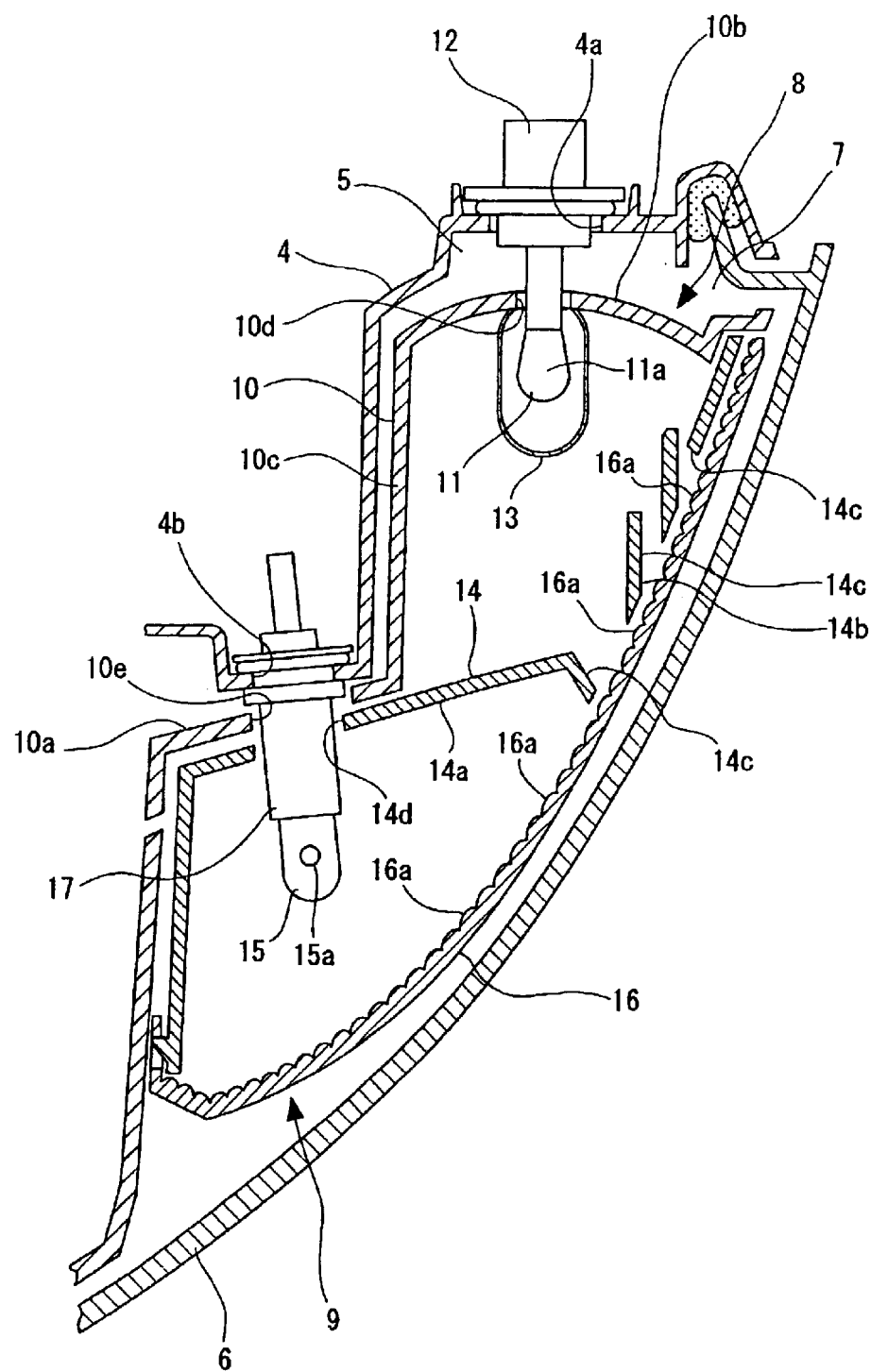
FIG. 2 is an enlarged cross-sectional view taken along the line II—II in FIG. 1.

As seen from FIG. 2, the vehicular lamp 1 includes a lamp housing 4 that accommodates four lamp components consisting of the two headlamp components 2 and 3, the front turn lamp component, and the clearance lamp component. The lamp housing 4 has a concave portion 5 that opens in the forward direction, and an outer lens 6 is mounted on the lamp housing 4 so as to cover the front opening area of the concave portion 5, thus defining a lamp chamber 7. The outer lens 6 is colorless and transparent and does not have a lens step, thus being a so-called plain cover.

A front turn lamp component 8 and a clearance lamp component 9 are provided on the right side area of the lamp housing 4. The above-described outer lens 6 is disposed in front of two lamp components 8 and 9 and covers them.

The front turn lamp component 8 is provided such that it occupies the right side end area of the lamp chamber 7; and it has an incandescent bulb 11, which is the light source, and a reflector 10.

The reflector 10 is comprised of a left side portion 10a positioned in the front side and a right side portion 10b positioned in the rear side, which are connected by a connecting middle portion 10c that extends in the longitudinal direction of the lamp 1. The right side portion 10b forms a concave curve that faces the front or the forward direction. The inner surface of the reflector 10 namely the surface that faces the forward and side directions, forms a reflecting surface which is formed by, for instance, aluminum vapor deposition. As seen from FIGS. 3 and 4, the connecting portion 10c protrudes in the left direction at both upper and lower end portions thereof, thus creating a frontal shape with a sideways U-shape. Although there is a demand to widen the light emitting portion of the front turn lamp portion 8 as much as possible, this cannot be formed into a reflecting surface because of the problems regarding the space for providing the bulb of the clearance portion 9 near the center in the vertical direction of the left side portion of the front turn lamp portion 8, and the necessity of protrusion in the forward direction of the lamp.

The incandescent bulb 11 is attached detachably via a socket 12 to a mounting hole 4a formed in the lamp housing 4 at a position that faces the reflector 10. The light emitting portion 11a of the incandescent bulb 11 is inserted into an insertion hole 10d formed on the right side portion 10b of the reflector 10 and positioned within the right side portion 10b. In addition, an amber-tinted globe 13 is attached to the light emitting portion 11a of the incandescent bulb 11 so as to provide an outside covering for the incandescent bulb 11.

When the incandescent bulb 11 is lit in the front turn lamp component 8, the light radiated from the incandescent bulb 11 is tinted amber by the globe 13, and this amber-colored light is reflected by the reflecting surface of the reflector 10 and directly radiated in approximately the forward direction.

The clearance lamp component 9 includes a reflector 14, an incandescent bulb 15 which is the light source, and an inner lens 16.

The frontal shape of the reflector 14 takes an oblong shape that is longer sideways. The vertical width of the reflector 14 is slightly larger than one quarter of the reflector 10, and the horizontal width has a size that is slightly larger than the horizontal width of the reflector 10. The reflector 14 is integrally formed from an operative reflecting surface portion 14a, which reflects light from the incandescent bulb 15 in the forward direction, and an extending portion 14b, which extends towards the right direction from the right end of the operative reflecting surface portion 14a. When viewed from the front, the operative reflecting surface portion 14a occupies an area that is approximately two-thirds of the left side of the reflector 14, and the extending portion 14b occupies an area that is approximately one-third of the right side of the reflector 14. Light transmission holes 14c (a light transmission portion) of a vertically oblong slit shape are formed in the extending portion 14b. In addition, an insertion hole 14d is formed in the position leftward of the operative reflecting surface portion 14a. Both front and rear surfaces of the reflector 14 are treated to form reflecting surfaces by appropriate means such as aluminum vapor deposition and the like.

The reflector 14 described above is disposed such that it intersects the front side of the reflector 10 of the front turn lamp component 8 at an approximate center in the vertical direction. A portion that is approximately half of the left side of the operative reflecting surface portion 14a then attains a state in which it is held on the front surface of the left side portion 10a of the reflector 10. Accordingly, the extending portion 14b and a portion that is approximately half of the right side of the operative reflecting surface portion 14a are positioned such that they intersect the front side of the right side portion 10b of the reflector 10 at an approximate center in the vertical direction. The incandescent bulb 11 of the front turn lamp component 8 is positioned on the rear side of or behind the reflector 14 so that it is not directly visible from the front (see FIG. 3).

The incandescent bulb 15 is attached detachably via a socket 17 to a mounting hole 4b formed in the lamp housing 4 at a position that corresponds to the insertion hole 14d of the reflector 14. The light emitting portion 15a of the incandescent bulb 15 is inserted through the insertion hole 10e formed on the left side portion 10a of the reflector 10 and further through the insertion hole 14d formed in the operative reflecting surface portion 14a of the reflector 14, thus being positioned inside the operative reflecting surface portion 14a.

Lens steps 16a that refract and/or diffusively refract light are formed on a colorless and transparent inner surface of the inner lens 16. The inner lens 16 covers the front area of the reflector 14.

Figure 3:
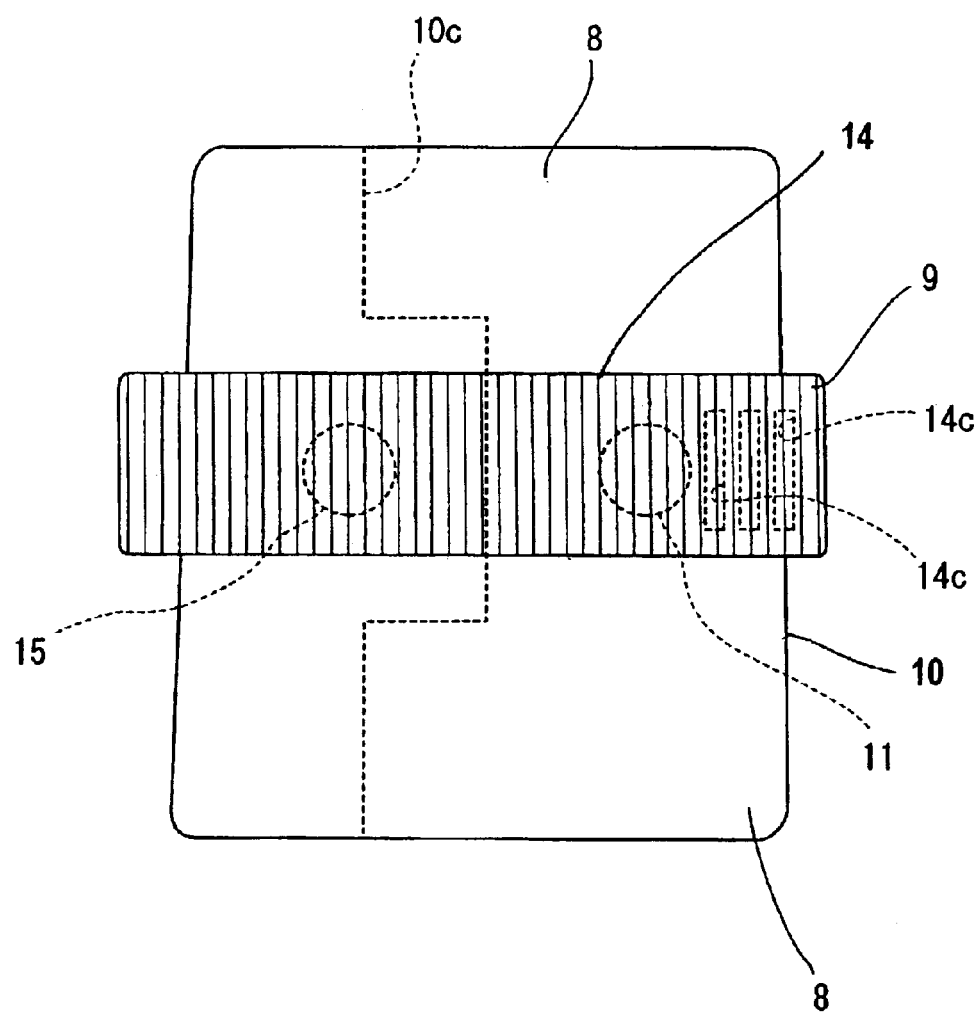
FIG. 3 is a schematic illustration showing the frontal appearance of the lamp when it is not lit.

In the vehicular lamp 1 described above, when viewed from the front while the incandescent bulbs 11 and 15 are both not lit, the reflector 10 of the front turn lamp component 8 that is visible through the outer lens 6 appears, as schematically shown in FIG. 3, to be divided into two, upper and lower, portions by the reflector 14 of the clearance lamp component 9. In other words, it appears as if there are two different lamp components. Moreover, in this vehicular lamp 1, since the lens steps 16a are formed on the inner lens 16 of the clearance lamp component 9, the reflector 10 clearly appears to be divided into two sections.

In addition, each of the front surfaces of the operative reflecting surface portion 14a and extending portion 14b of the reflector 14 of the clearance lamp component 9 (the reflector 14 being an element that divides the reflector 10 of the front turn lamp component 8 into two, upper and lower, portions) is treated to form a reflecting surface. Accordingly, the operative reflecting surface portion 14a and the extending portion 14b appear to be integrated when the incandescent bulbs 11 and 15 are both not lit Furthermore, the back surface of the reflector 14 of the clearance lamp component 9 is reflected on the reflector 10 of the front turn lamp component 8. However, the back surface of the reflector 14 is also treated to have a reflecting surface; therefore, when the incandescent bulbs 11 and 15 are both not lit, the lamp gives an impression that only the reflector 10 appears, and any other images do not appear as if being reflected on the reflector 10.

Moreover, the incandescent bulb 11 of the front turn lamp component 8 is provided on the rear side of or behind the reflector 14 of the clearance lamp component 9. Accordingly, the incandescent bulb 11 (more accurately, the globe 13) cannot be seen directly.

Figure 4:
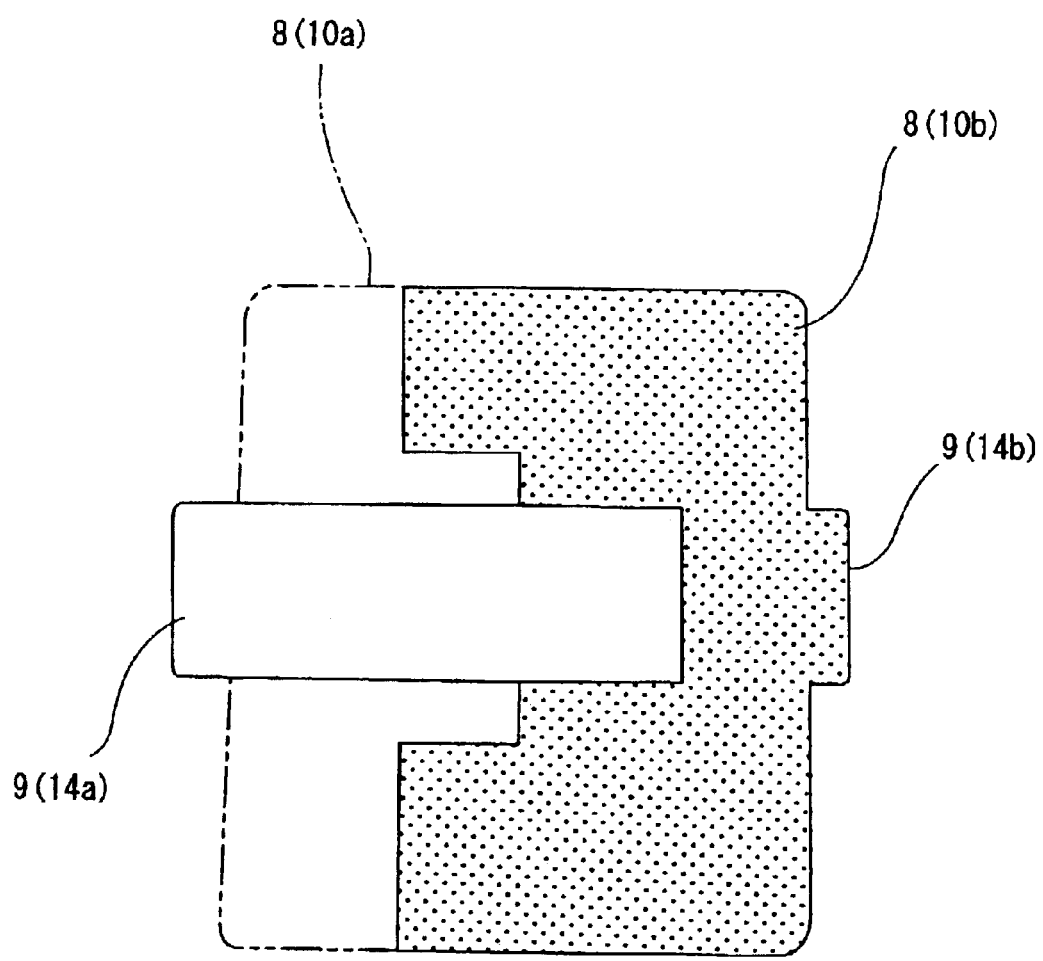
FIG. 4 is a schematic illustration showing the frontal appearance of the lamp when it is lit

When the incandescent bulb 11 of the front turn lamp component 8 is lit, light directly radiated from the incandescent bulb 11 and light radiated from the incandescent bulb 11 and reflected by the reflecting surface of the reflector 10 are radiated in the forward direction. In the area that is in front of the incandescent bulb 11 and is blocked by the reflector 14 of the clearance lamp component 9, the directly radiated light of the incandescent bulb 11 and the light reflected by the reflector 10 pass through the light transmission holes 14c formed in the extending portion 14b and radiate in the forward direction. Thus, as shown in FIG. 4, the portion of the front turn lamp component 8 that corresponds to the right side portion 10b of the reflector 10 appears to be illuminated (the illuminated portion is shown shaded). In other words, the illuminated portion appears to be a single illuminated lamp. Accordingly, those seeing such an illuminated portion will be able to immediately recognize that such an illuminated portion has a particular meaning, and they can recognize that the turn lump component 8 is showing that the vehicle is going to turn right.

In the vehicular lamp 1, the inner lens 16 of the clearance lamp component 9 has the lens steps 16a. Accordingly, light passing through the light transmission holes 14c is diffused by the lens steps 16a, and irregularities in the direction of light in the area where the light transmission holes 14c are provided is prevented.

In the above embodiment, two lamp components 8 and 9 are provided so as to be longitudinally overlapped (one in front of the other), together with other lamp component (the headlamp component), inside a single lamp chamber. The present invention is implemented not only in such an embodiment, but also in a structure in which two longitudinally overlapping lamp components are formed integrally in a single body.

In the shown embodiment, the directly radiated light of the incandescent bulb 11 and the light reflected by the reflector 10 pass through the light transmission holes 14c formed in the extending portion 14b and radiate in the forward direction. Instead of the light transmission holes 14c, which are called "the light transmission portion" in the above description, the light transmission portion can take other types of configurations. In one of the other types of the light transmission portion, the reflector 14 is made of a transparent material, and vapor deposition is applied to this transparent reflector 14 with areas that allow the above-described lights to pass through being covered with masking. As a result, such areas left transparent and can let the lights pass through and radiate the front. Also, the light transmission portion can be half-mirror-treated.

Also, the shape and structure of each portion shown in the above embodiment are mere examples in which the present invention is implemented; and these must not be interpreted as a restriction of the technical scope of the present invention.

As is evident from the description above, in the vehicular lamp according to the present invention, a first lamp component having a first light source and a first reflector, and a second lamp component having a second light source and a second reflector, are provided, and the front sides of such two lamp components are covered by an outer lens; and in this structure, the first reflector has an overlapping area that covers the front area of the second reflector such that the second reflector appears to be segmented in two or more sections, and light transmission holes are formed in at least a part of the overlapping area so that light from the second lamp component passes through the light transmission holes.

Accordingly, when lit, light from the second lamp component passes through the light transmission holes formed in the overlapping area of the reflector of the first lamp component and radiates in the forward direction. Therefore, when the second lamp component is not lit, the second reflector conspicuously appears to be divided into two portions by the first reflector; and when the second lamp component is lit, then the illuminated portion of the second lamp component appears continuous, that is, it appears not to be divided into two portions but appears to be a single lamp. Thus, the appearance of the lamp when it is lit and when it is not lit drastically changes, giving an observer a sense of unexpectedness. In addition, when the present invention is applied to a marker lamp, it is possible to avoid that two separated (divided) portions appear to irradiate the same functioning color lights. Since only one functioning (turning, for instance) color light is irradiated when the second lamp components is lit even though the second lamp component appears to be two separated lamp when it is not lit, confusion caused by a single functioning color light irradiated from two separated portions would not occur, and an observer can instantaneously determine the meaning of the irradiated light.

Furthermore, in the present invention, part of the overlapping area is formed as an extending portion that does not reflect light directly radiated from the first light source in the forward direction; and the front surface of the extending portion is treated so as to have a surface that is identical to the operative reflecting surface that reflects light directly radiated from the first light source in the forward direction. Accordingly, when the first lamp component is not lit, the entire first reflector clearly appears as a single element.

In the present invention, the second light source is positioned behind the overlapping area of the first reflector. Accordingly, the second light source is not directly visible from the front, and thus the overall appearance of the lamp is greatly improved.

Furthermore, the outer lens is a plain lens, the inner lens that covers the front of the first reflector is provided inside the outer lens, and a lens step that refracts and/or diffusively refracts light is formed on the inner lens. Accordingly, when the first lamp component is not lit, the presence of the first lamp component is emphasized, and a novel appearance showing that the first lamp component is on the front side of the second lamp component is emphasized. In addition, when the second lamp component is lit, light of the second lamp component passes through the light transmission holes and is diffused by the lens step. Accordingly, light irregularity at a location where the light transmission holes are provided is solved, and the light emitting portion appears to be entirely a single portion when the second lamp component is lit.

In addition, since the back surface of the overlapping area of the first reflector has a reflecting surface, the back surface of the first reflector, which reflects on the second reflector, is not conspicuous.

What is claimed is:

1. A vehicular lamp wherein said vehicular lamp comprises a first lamp component having a first light source and a first reflector, and a second lamp component having a second light source and a second reflector, and front sides of said first and second lamp components are covered by an outer lens, and wherein said first reflector has an overlapping area that covers a front of said second reflector such that said second reflector appears to be segmented in two or more portions;

a light transmission portion through which light from said second lamp component passes is formed in at least a part of said overlapping area;

a part of said overlapping area is formed as an extending portion that allows light from said first light source not to be directly radiated in a forward direction; and a front surface of said extending portion has a reflecting surface identical to an operative reflecting surface that reflects light directly radiated from said first light source in a forward direction.

2. The vehicular lamp according to claim 1, wherein said second light source is provided behind said overlapping area of said first reflector.

3. A vehicular lamp wherein said vehicular lamp comprises a first lamp component having a first light source and a first reflector, and a second lamp component having a second light source and a second reflector, and front sides of said first and second lamp components are covered by an outer lens, and wherein said first reflector has an overlapping area that covers a front of said second reflector such that said second reflector appears to be segmented in two or more portions;

a light transmission portion trough which light from said second lamp component passes is formed in at least a part of said overlapping area;

said outer lens is a plain lens;

an inner lens that covers a front surface of said first reflector is provided on an inner side of said outer lens; and a lens step that refracts and/or diffusively refracts light is formed on said inner lens.

4. A vehicular lamp wherein said vehicular lamp comprises a first lamp component having a first light source and a first reflector, and a second lamp component having a second light source and a second reflector, and front sides of said first and second lamp components are covered by an outer lens, and wherein said first reflector has an overlapping area that covers a front of said second reflector such that said second reflector appears to be segmented in two or more portions;

a light transmission portion through which light from said second lamp component passes is formed in at least a part of said overlapping area; and said light transmission portion is formed as a light transmission hole.

5. The vehicular lamp according to claim 4, wherein said transmission hole has a vertically oblong slit shape.

6. The vehicular lamp according to claim 4, wherein a part of said overlapping area is formed as an extending portion that allows light from said first light source not to be directly radiated in a forward direction; and a front surface of said extending portion has a reflecting surface identical to an operative reflecting surface that reflects light directly radiated from said first light source in a forward direction.

7. The vehicular lamp according to claim 6, wherein said second light source is provided behind said overlapping area of said first reflector.

8. The vehicular lamp according to claim 7, wherein said outer lens is a plain lens;

an inner lens that covers a front surface of said first reflector is provided on an inner side of said outer lens; and a lens step that refracts and/or diffusively refracts light is formed on said inner lens.

9. The vehicular lamp according to claim 8, wherein a back surface of said overlapping area of said first reflector has a reflecting surface.

* * * * *